F. V. DETWILER.
COOKING APPARATUS.
APPLICATION FILED OCT. 2, 1911.
1,119,579.
Patented Dec. 1, 1914.
6 SHEETS—SHEET 1.
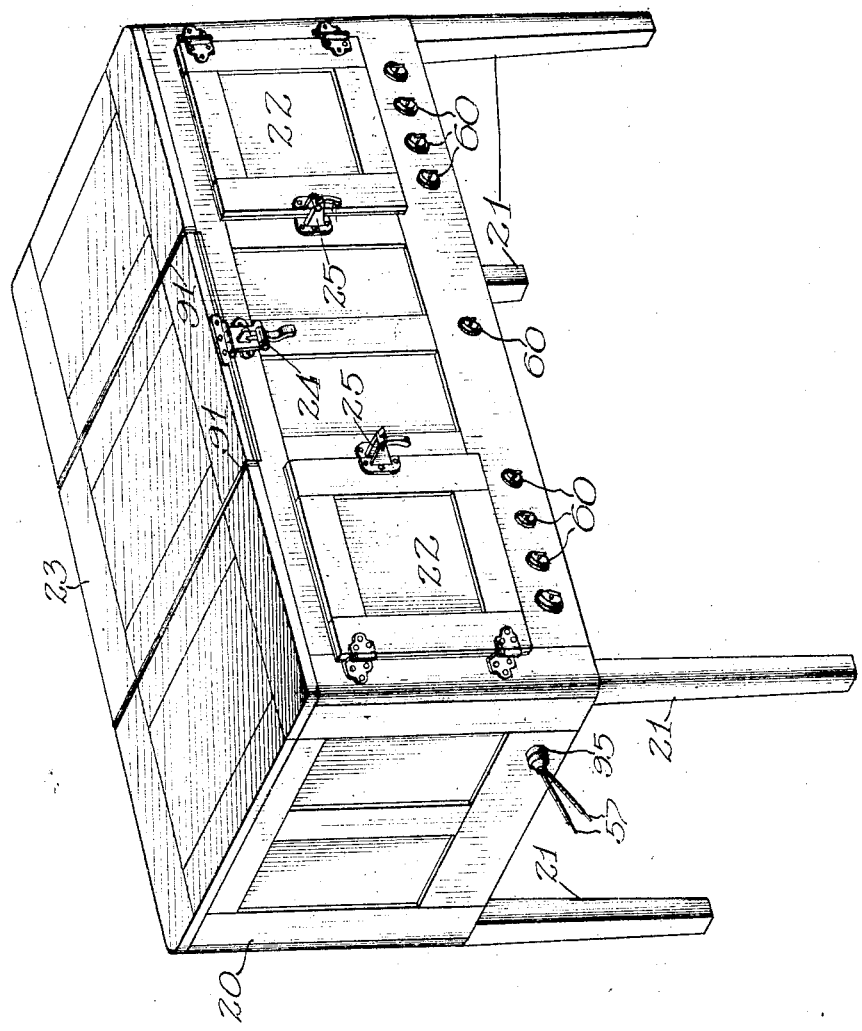

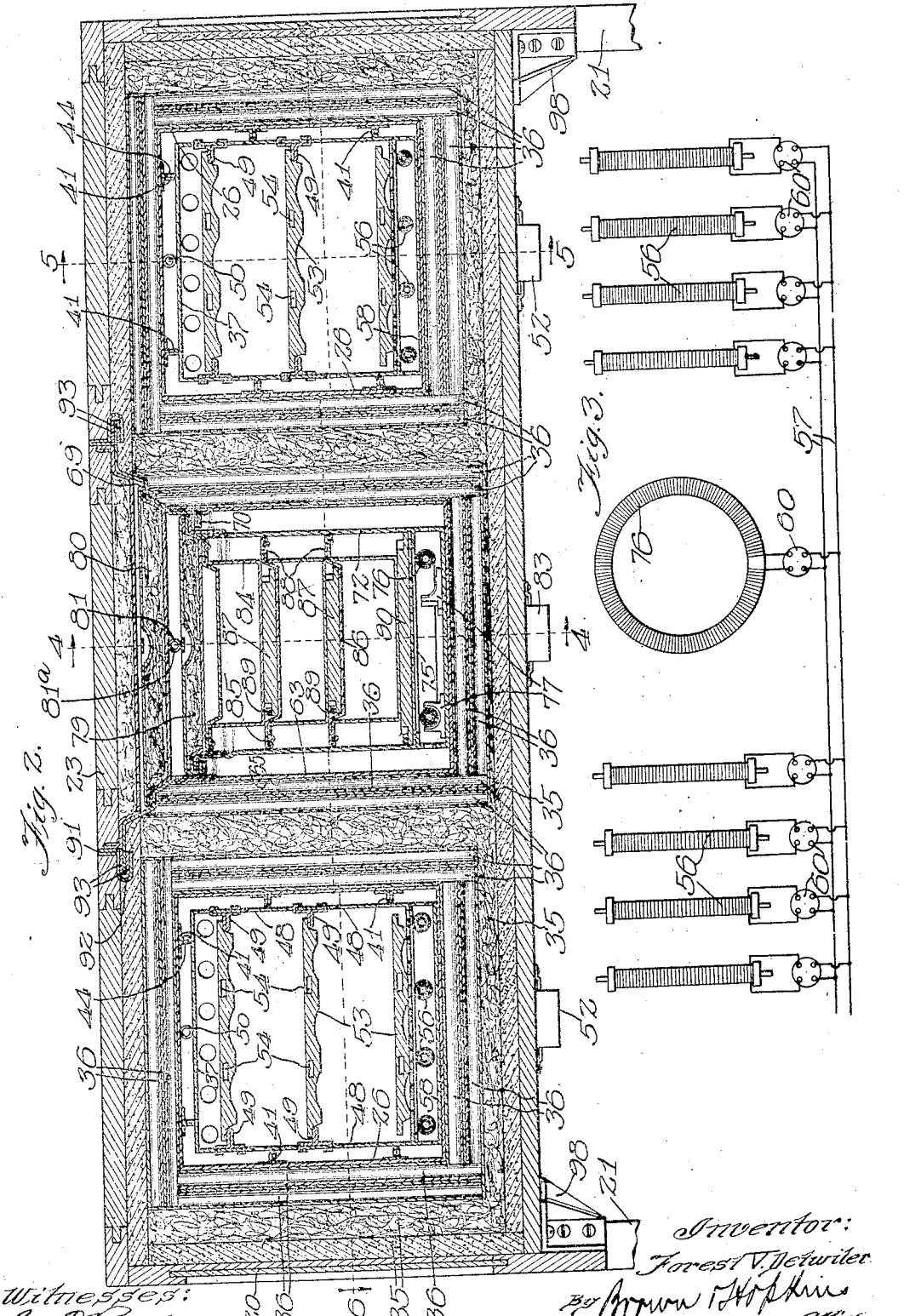

F. V. DETWILER.
COOKING APPARATUS.
APPLICATION FILED OCT. 2, 1911.

1,119,579.

Patented Dec. 1, 1914.
6 SHEETS—SHEET 3.

Witnesses:
Inventor:
Forest V. Detwiler

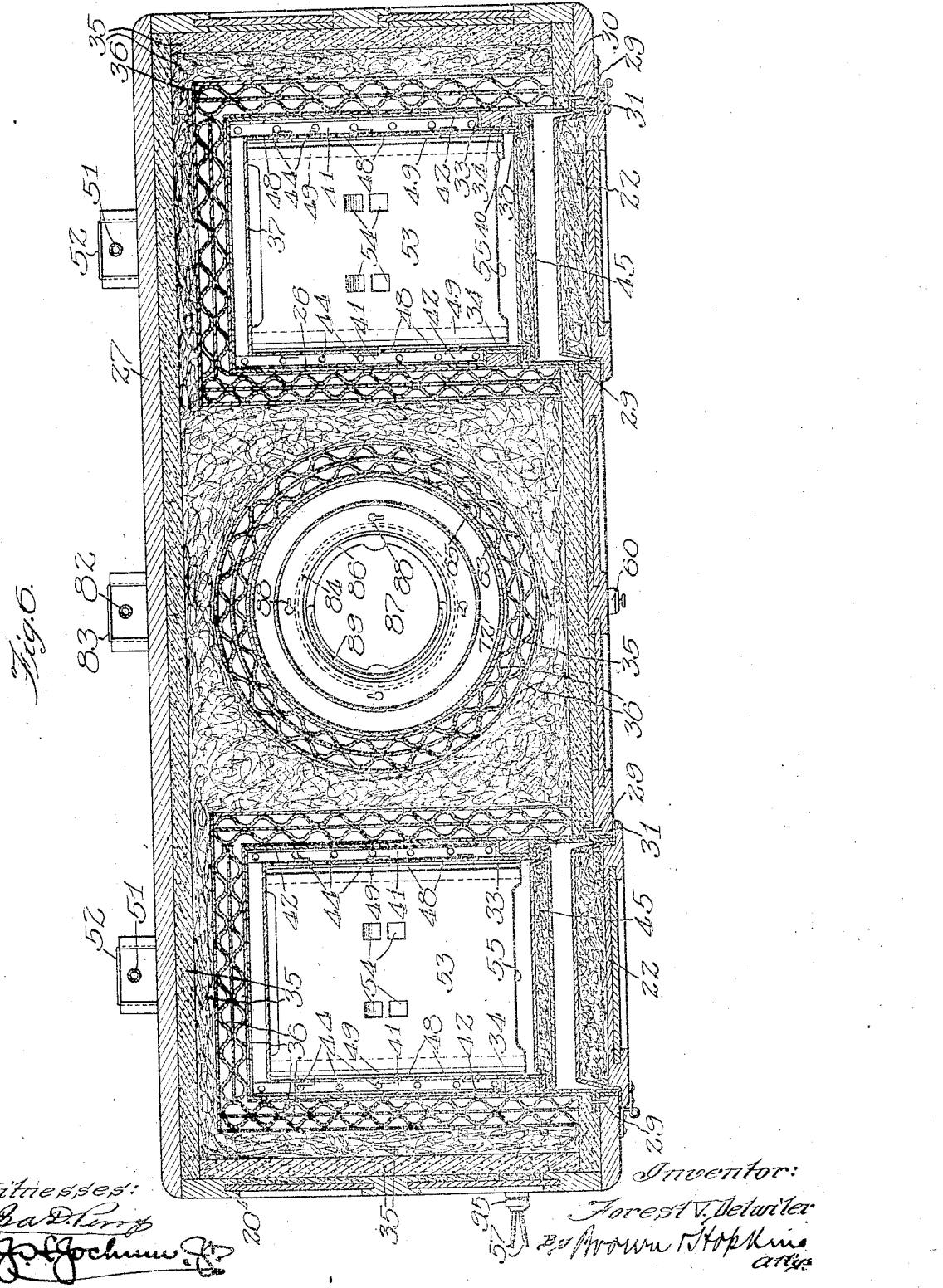

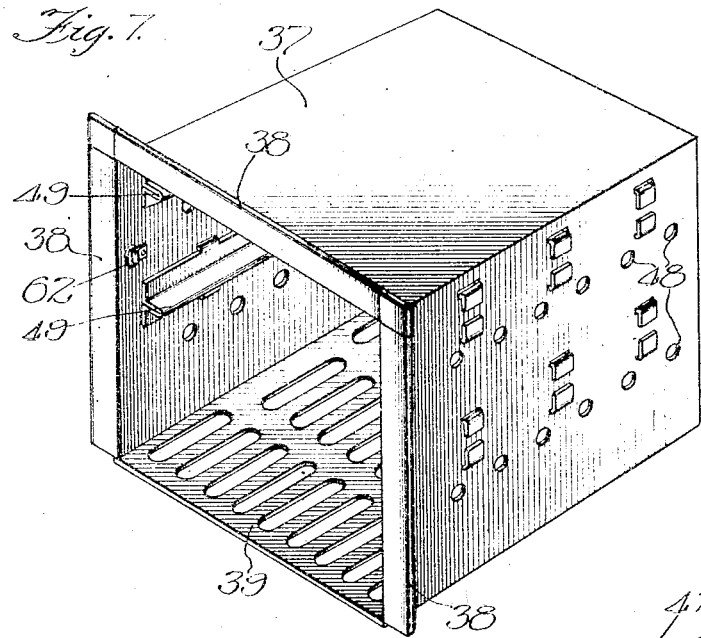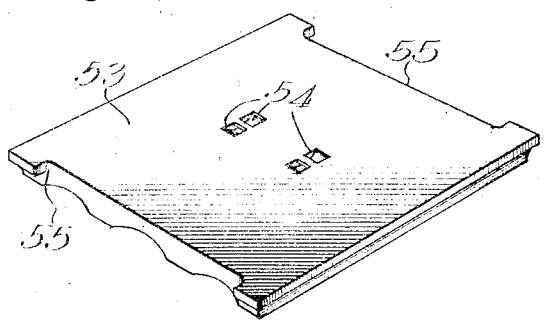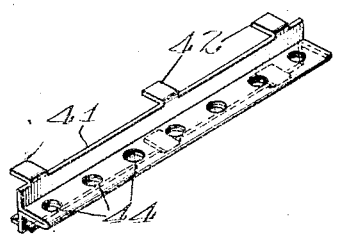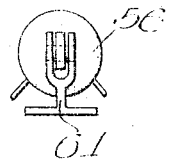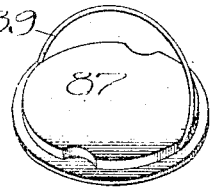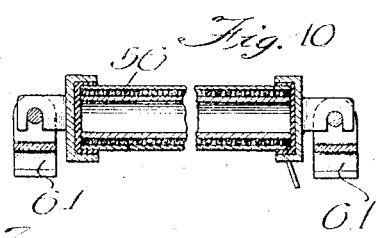

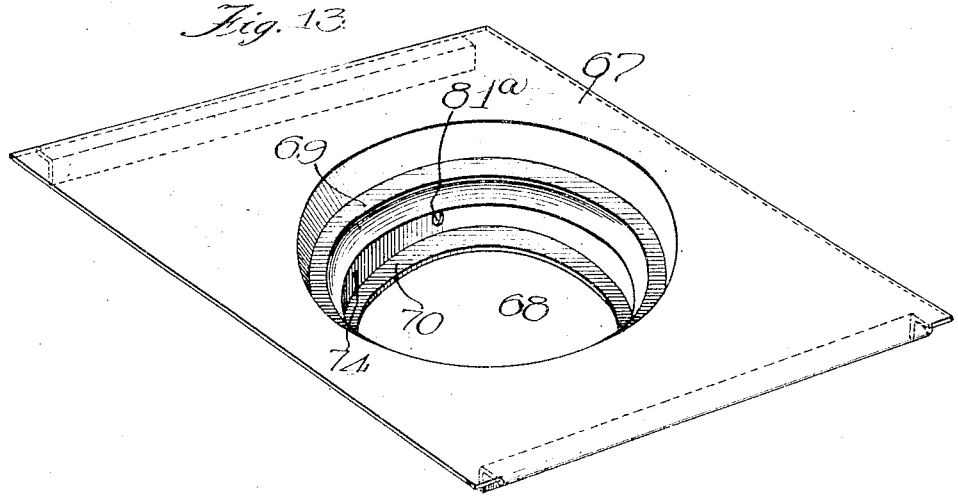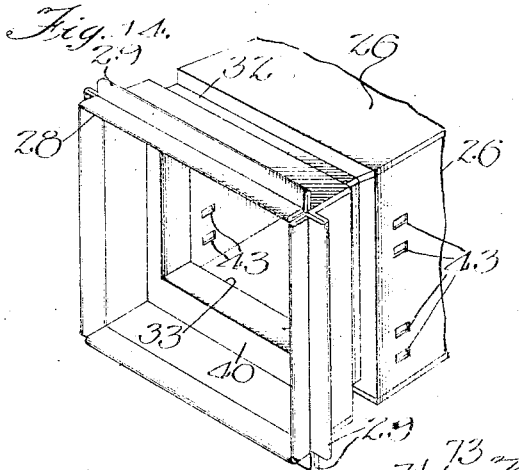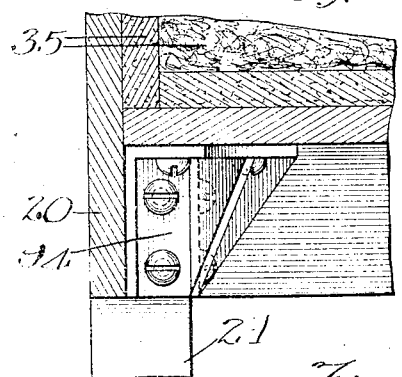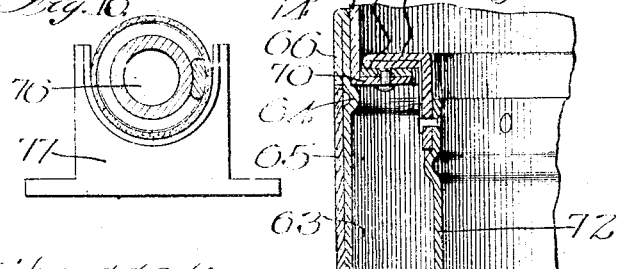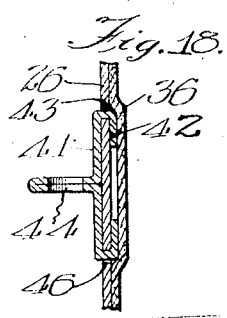

UNITED STATES PATENT OFFICE.

FOREST V. DETWILER, OF CHICAGO, ILLINOIS.

COOKING APPARATUS.

1,119,579.   Specification of Letters Patent.   Patented Dec. 1, 1914.

Application filed October 2, 1911. Serial No. 652,482.

*To all whom it may concern:*

Be it known that I, FOREST V. DETWILER, a citizen of the United States, residing at Chicago, in the county of Cook and State of Illinois, have invented certain new and useful Improvements in Cooking Apparatus, of which the following is a specification.

This invention relates to improvements in cooking apparatus and more particularly to that type known as "heat retaining cookers," in which the articles to be cooked are initially heated, and the heat thus generated in the articles is confined in the casing to complete the cooking operation, and one of the objects of the present invention, is to provide an improved apparatus of this class having means whereby the heat may be obtained by heating apparatus located within the casing or by means of heating plates, which latter are first heated and then placed in the casing.

A further object of the invention is to provide an improved apparatus of its class, having cooking chambers which may be readily removed from the casing for cleaning purposes.

A further object is to provide an improved apparatus of this class having means for catching and confining any vapor which may escape from the cooking compartment, and conveying the vapor to the outside of the casing and condensing the same.

A further object is to provide an improved apparatus of this class, which will be simple, durable and cheap in construction and effective and efficient in operation.

To the attainment of these ends, and the accomplishment of other new and useful objects, as will appear, the invention consists in the features of novelty in substantially the construction, combination and arrangement of the several parts hereinafter more fully described and claimed and shown in the accompanying drawings exemplifying the invention, and in which—

Figure 4:
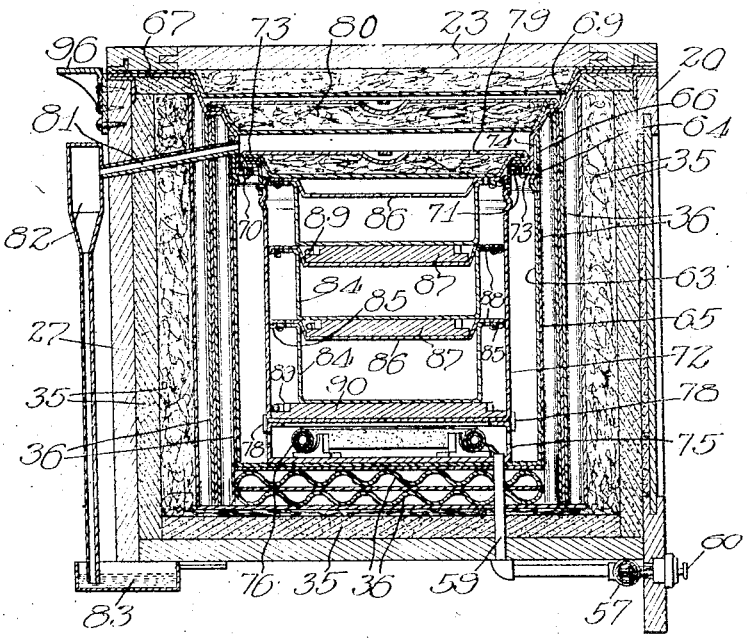
Figure 5:
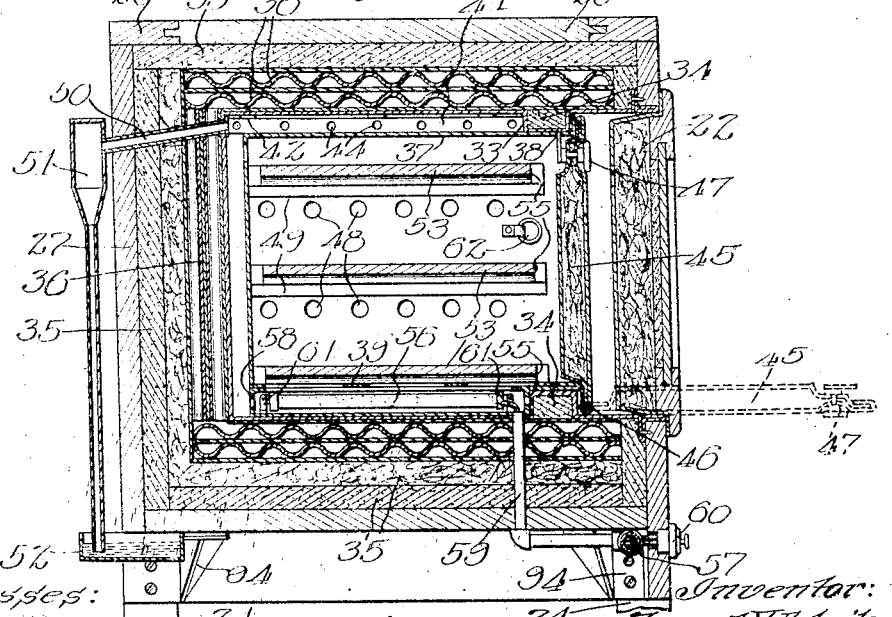

Figure 1 is a perspective view of an improved apparatus of this class, constructed in accordance with the principles of this invention; Fig. 2 is a vertical longitudinal sectional view; Fig. 3 is a diagrammatic view of an electric heating system; Fig. 4 is a sectional view on line 4—4, Fig. 2; Fig. 5 is a sectional view on line 5—5, Fig. 2; Fig. 6 is a horizontal sectional view on line 6—6, Fig. 2; Fig. 7 is a perspective view of one of the cooking chambers removed from the casing; Fig. 8 is a perspective view of one of the heating plates; Fig. 9 is a perspective view of one of the spacing members for spacing the cooking chamber from the receiving frame or casing; Fig. 10 is a longitudinal sectional view of one of the heating coils; Fig. 11 is an end view of Fig. 10; Fig. 12 is a detail perspective view of one of the heating plates; Fig. 13 is a detail perspective view of the top of the protecting plate for one of the cooking compartments; Fig. 14 is a detail perspective view of one end of one of the frames or casings which surround and receive the cooking chambers; Figs. 15, 16, 17 and 18 are enlarged sectional views showing details of construction.

Referring more particularly to the drawings and in the present exemplification of this invention, the numeral 20 designates generally an inclosing casing which is supported upon suitable legs 21. This casing may be of any desired size and configuration, and may be constructed of any suitable material, but in the present exemplification of the invention, it is shown as being of a rectangular configuration, having door openings in the front side thereof which are closed by suitable closures 22, and these door openings and closures 22 are located preferably adjacent the ends of the casing to form a space therebetween, and over this space is arranged a closure 23, which closure forms a portion of the top of the casing and is provided with suitable fastening devices 24, while the closures 22 are provided with suitable fastening devices 25.

Any suitable number of ovens or cooking compartments may be arranged within this casing, and in the present exemplification of this invention, three are shown, one adjacent each of the closures 22, through which access may be had to the ovens or cooking compartments, and one intermediate the two above referred to, to the interior of which latter access may be had through the opening closed by the closure 23. In the present exemplification of the invention, the construction of each of the end ovens or compartments is the same, and therefore a specific description of one will apply equally as well to both.

Arranged within the casing 20, adjacent each of the openings closed by the closures 22, is a frame or casing designated generally by the reference numeral 26, which is of any desired size and configuration, preferably of rectangular cross section, and is constructed of any suitable material, preferably sheet material, such as metal or the like, and is of a size substantially equal to the area of the openings closed by the closure 22. This casing 26 is placed into the casing 20 from the rear thereof and before the back 27 is secured in place. The casing is provided adjacent its forward edge 28 with a lateral projecting circumferential flange 29, which latter projects any desired distance beyond the outer face of the casing and is of such a size that when the casing 26 is inserted in the outer casing, the edge 28 thereof will project into the door opening in the front of the casing, while the circumferential flange 29 will engage and rest against the inner face of the front wall of the outer casing. When thus inserted, the casing 26 is held in position in any desired or suitable manner, preferably by means of fastening devices 30 passing through the flange 29 and into the front wall of the inclosing casing. If desired, suitable material 31, such as asbestos, mineral wool or the like may be provided, which is inserted between the flange 29 and the adjacent edge of the door opening. The casing 26 is provided adjacent its forward end with a circumferential groove or recess 32 opening through the outer face of the casing to form a shoulder 33 (see Fig. 6) for a purpose to be hereinafter set forth. Filler blocks 34 are provided, which are inserted into the groove 32 for reinforcing or strengthening that portion of the casing. The casing is of such a length that it will terminate short of the rear wall 27 of the outer or inclosing casing, and arranged between the casing 26 and the walls of the inclosing casing, is suitable heat insulating material 35, such as mineral wool, asbestos, or the like, and if desired, ventilated or aerated insulated material 36 may also be provided, which is preferably arranged in contact with the outer face of the frame or casing 36. Similar insulating material is placed adjacent the rear wall 27 of the inclosing case.

Arranged within the casing 26 is a cooking compartment designated generally by the reference numeral 37, more clearly shown in Fig. 7, which is of any desired size and configuration, but is of a size somewhat smaller than the interior of the casing 26 into which latter this compartment 37 is adapted to be inserted, and when thus inserted, the walls of the compartment will be spaced from the walls of the casing to form a heated air passageway around the compartment 37. This compartment 37 is provided with flanges 38 on the forward edges of the sides and top, and the bottom 39 thereof is apertured as shown, to permit heated air to pass into the compartment through the bottom. When the compartment is inserted within the casing 26, the flanges 38 will engage or abut the shoulders 40 formed by the groove 32 in the casing, and by means of which the inward movement of the compartment 37 with respect to the casing 26, will be limited.

In order to hold the compartment properly spaced from the casing 26, spacing members 41 are provided, which are preferably secured to the side walls of the casing 26 by means of fastening tongues or projections 42 on the members 41, which tongues pass through suitable apertures 43 in the walls of the casing and are flanged down upon the outer face of the casing wall 26, as shown more clearly in Fig. 18. These members 41 are provided with apertures or openings 44 therethrough, so as not to form an obstruction for the heated air, and through which apertures the heated air will pass. These members 41 are of a size to engage the walls of the compartment 37 when the latter are in position. It is not necessary to place these spacing members at the rear of the compartment 37, but if desired, they may be employed. The front of the compartment 37 is open and the shoulder 40 formed on the casing 26 is so located with respect to the outer face of the front of the inclosing casing 20 to form a space of some size therebetween, in which space is arranged a suitable door or closure 45, which latter is hinged as at 46 (see particularly Fig. 5). This closure 45 is insulated as shown, and is secured in its closed position by means of a fastening device 47 of any ordinary and well known construction. The door is so mounted that when it is lowered into the position shown in dotted lines in Fig. 5, one face of the door will substantially coincide with the bottom 39 of the compartment 37, and thereby act as a support and guide for directing the article into the compartment. The side walls of the compartment 30 are also provided with a series of apertures or openings 48, through which the heated air circulates, and heater plates or shelf-supports 49 are secured to the side walls within the compartment 37 in any suitable manner, preferably in a manner similar to the manner in which the spacing members 41 are secured in position. The spacing members 41 may also be secured to the top of the casing 26 so as to engage the top of the compartment 37 and to form a space between the tops of the casing and compartment, and into which space the vapor which passes from the compartment 37 through the openings 48, will accumulate.

In the operation of baking, it is necessary in order to secure the desired results, to convey away substantially all moisture and maintain the heated air as dry as possible, and for this purpose, the space between the compartment 37 and the casing 26 is provided. It is also advisable to convey away this accumulated vapor, and for this purpose, there is provided a passage 50 (see particularly Figs. 2 and 5) preferably in the form of a tubular member, such as a pipe which extends through one of the walls, preferably the rear wall of the inclosing casing, and has communication with the space between the tops of the casing 26 and compartment 27. On the outside of the casing 20 is arranged a condenser 51, into which the vapor is discharged from the passage 50 to be condensed, and when condensed, the water of condensation will flow out of the condenser 51 into a suitable receptacle 52 removably supported in any desired or suitable manner adjacent the discharge end of the condenser so as to be removed when filled with water and emptied and then replaced. The closure 22 is also provided with suitable insulating material so that the heat will be retained in the inclosing casing.

Heat may be supplied to the compartments 37 either by means of a heating apparatus or heat generator located within the casing or by means of heating plates, 53, which are first heated and then placed within the compartment. If these heated plates 53 are employed, they are placed within the compartment 37 either upon the bottom 39 thereof or upon the supports 49 or both, and in order to permit these plates 53 to be readily transported, lifter openings 54 are provided therein. In order that the circulation of the heated air in the compartment 37 will not be interfered with, these heating plates 53 may be provided with cut out portions 55 to form passages for the heated air. In the present exemplification of this invention, electric heating coils 56 are employed which receive their source of supply of heating fluid through the conductors 57 leading from any suitable source. Any number of these coils 56 may be provided for each compartment and are arranged beneath the compartment 37 and between the latter and the casing 26. These coils 56 are themselves arranged within a casing 58 having apertured walls. The casing 58 is of a size and configuration to fit within the space between the bottoms of the casing 26 and compartments 37, and which space is formed by the grooved or offset portions 32 of the casing 26. After the casing 26 has been placed within the inclosing casing in the manner already described, the casing 58 containing the coils 56 is next placed within the casing 26 preferably through the front thereof, after which the compartment 37 may be inserted. In order to protect the conductors 57 where they extend through the inclosing casing, a suitable conduit 59 may be provided. In the present exemplification of this invention, a plurality of coils 56 are shown, and when a plurality is employed, each of the coils is provided with a switch or cut off 60 of the ordinary well known type. These coils are preferably connected in parallel so that any one or more of the cut offs 60 may be operated to cut off the desired number of coils, and by means of which the amount of heat may be controlled. The coils 56 are preferably removably secured in position within the casing 58, and for this purpose, suitable supports 61 (see Fig. 10) are provided with which the coils have detachable engagement. With this improved construction, it will be manifest that the compartments 37 may be readily removed from the casing 26 by simply opening the door 22 and lowering the door 45, as shown in dotted lines in Fig. 5. The door 45 is so constructed that when in this position, its inner face will not interfere with the ready removal of the compartment 37 and in order to facilitate the ready removal of this compartment, handles 62 are provided on the walls of the compartment.

The oven which is arranged between the two end ovens and preferably substantially at the center of the inclosing casing, is of a construction substantially similar to the others, with the exception that it opens through the top of the casing, and comprises a casing 63 corresponding with the casing 26. This casing is of any desired configuration and size, but in the present exemplification of the invention, is shown as being circular in cross section and of a height to extend substantially the entire height of the inclosing casing as shown more clearly in Fig. 2. This casing 63 rests upon suitable insulating material 36 disposed between the bottom thereof and the bottom of the inclosing casing, and is preferably offset as at 64 (see particularly Fig. 17) to form a supporting ledge and a filler 65, preferably of sheet insulating material is provided which engages the outer wall of the casing 63 to fill the space between the insulating material 36 and the wall of the casing 63, which is formed by the bent back portion 66 of the upper end of the casing 63. A plate 67 (see particularly Fig. 13) is provided for covering the opening into which the casing 63 is arranged, and also for covering the insulating material surrounding the casing. This plate 67 is provided with a central aperture 68 formed by cutting away a portion of the plate and flanging a portion of the plate into the aperture to form a series of steps or shoulders 69 and 70. The deflected portion of the plate 67 adjacent the shoulder 70, is of a size to fit within the top of the casing 63 as shown more clearly in Figs. 2 and 17, so as to engage and rest upon the shoulder and offset portion 64 of the casing, and if desired, suitable heat insulating material 71 may be provided which is secured to the shoulder 70 in any desired or suitable manner.

A compartment, 72, corresponding with the compartments 37, is provided which is inserted within the casing 63 and is of a size somewhat smaller than the interior diameter of the casing 36. The upper edge of this compartment 72 is deflected as at 73 to form a circumferential flange and this flange may be formed integrally with the compartment 37, or may be formed separately or secured thereto. The flange is adapted to engage and rest upon the insulation 71 supported by the shoulder 70 and is of a size to engage and contact with the portion 74 of the plate 67 adjacent the support 70, and serves as a means for holding the compartment 72 centrally within the casing 63. The compartment 72 is of a depth somewhat less than the depth of the casing 63 to form a space at the bottom of the casing for the reception of another casing 75, within which is arranged the heating coil 76 supported upon suitable supports 77. In order to hold the casings 75 and 72 against displacement with respect to each other, suitable lips or projections 78 may be provided which project from one casing over the other. A closure 79 is provided for the compartment 72 and this closure rests preferably upon the flange 73. A second closure 80 is also provided which is spaced above the closure 79 and rests upon the shoulder 69 formed in the plate 67 to form a space between the closures, with which space a tubular member 81 communicates through an opening 81ª in the portion 74 of the plate 67, and extends through one of the walls of the inclosing casing 20 and discharges into a condenser 82 arranged at the outside of the inclosing casing. This condenser is similar to the condenser 51, and also discharges its water of condensation within a drip pan 83, which latter is removably supported in any suitable manner. The closure 23 is also provided with insulation, which latter extends into the opening in the plate 67 above the closure 81.

Arranged within the compartment 72 in the present exemplification of this invention, are a series of cooking vessels 84, which are of a size somewhat less than the compartment 72. These vessels 84 are provided with a peripheral flange 85 around their upper edges, which contact with the wall of the casing 72 to hold the vessel spaced therefrom and a closure 86 is provided for each of the vessels. Each of the closures 86 is provided with a depressed or recessed portion extending into the vessel to form a receptacle into which heating plates 87, are adapted to be placed, and when thus placed within the receptacle in the closures, the cooking vessels 84 may be superposed. The flanges 85 and the closures 86 are provided with registered apertures 88 to permit vapor to pass therethrough. In this form of the invention, any vapor which will work its way past the closure 79 and into the space between the closures 79 and 81, will pass from said space through the discharge tube 81 into the condenser. In order to permit the heating plates 87 to be readily transported, they are provided with a bail or handle 89. A heating plate 90, which is of a size to substantially fill the compartment 72, may also be provided, and is adapted to be inserted into the compartment to rest upon the bottom thereof. A support 91 (see Fig. 2) is provided which surrounds the opening of the door 23, and is provided with a portion 92 bent back upon itself to form a support which projects into the outer inclosing casing. This portion 92 is adapted to receive the peripheral edge of the plate 67 and insulation 93 may also be provided on each side of the plate 67 and between the plate and the adjacent portions of the support 92. Suitable brackets or angle pieces 94 may also be provided for securing the parts together and for holding them against displacement. All of the heat generating coils 56—76 are arranged in series and a plug 95 is provided for connecting the source of supply with the conductors 57.

With this improved apparatus, different cooking operations of different natures may be carried on at one and the same time, and the same source of heat may be employed in all of them, or if desired, the heat may be supplied through different mediums, such as the heating coils or the heating plates. A bracket 96 (see Fig. 4) is preferably provided which serves as a support for the closure 23 when the latter is open, and this bracket also serves as a means for protecting the condensers 51—82 in that they will prevent the apparatus from being forced back against the wall which would tend to jam or injure the condenser. Obviously the ovens may be arranged within the inclosing casing in any position, but the preferred manner of arrangement and one which has proved the most satisfactory, is the arrangement shown in the accompanying drawings. When it is desired to remove the insulation 35—36 as well as the casings 26, this may be accomplished by removing the back 27 of the inclosing casing, and after the insulation has been removed, the fastening devices 29 may be removed.

What is claimed as new is:

1. In a heat retaining cooking apparatus, the combination of an inclosing casing having an opening in one wall, a second casing removably secured within the first recited casing and having an opening in one wall registering with the first said opening, means for holding the second casing and spacing it from the inclosing casing, insulating material disposed between the walls of the casings, a closure for the second recited casing, a cooking compartment removably mounted in the latter, a separate closure for the cooking compartment hinged in the casing, and a source of supply of initial heat.

2. In a heat retaining cooking apparatus, the combination of an inclosing casing having an opening in one wall, a second casing removably secured within the first said casing and having an opening in one wall registering with the first said opening, a closure for said openings, a cooking compartment removably supported within the second recited casing, means for holding the cooking compartment spaced from the walls of the adjacent casing, the said means being provided with openings therethrough, and a source of supply of initial heat.

3. In a heat retaining cooking apparatus, the combination of a heat insulated casing having an entrance opening, there being a projection on the walls of the casing extending around the casing and projecting thereinto, a cooking compartment removably arranged within the casing with its walls engaging the projection to form a space between the walls of the casing and compartment, spacing members arranged within said space, a closure for the casing, and a source of supply of initial heat.

4. In a heat retaining cooking apparatus, the combination of a heat insulated casing having an entrance opening, there being a projection on the walls of the casing extending around the casing and projecting thereinto, a cooking compartment removably arranged within the casing with its walls engaging the projection to form a space between the walls of the casing and compartment, said compartment having an entrance opening and a laterally projecting flange surrounding such opening, said flange engaging over the projection for limiting the insertion of the compartment into the casing, a closure for the opening in the casing, and a source of supply of initial heat.

5. In a heat retaining cooking apparatus, the combination of a heat insulated casing having an entrance opening, there being a projection on the walls of the casing extending around the casing and projecting thereinto, a cooking compartment removably arranged within the casing with its walls engaging the projection to form a space between the walls of the casing and compartment, said compartment having an entrance opening registering with the opening in the casing and a laterally projecting flange surrounding such opening, said flange engaging over the said projection, a hinged closure for the compartment, one face of such closure when the latter is open, substantially coinciding with the bottom of the compartment, a second closure for the casing and a source of supply of initial heat.

6. In a heat retaining cooking apparatus, the combination of a heat insulated casing having an entrance opening, there being projections on the walls of the casing extending around the casing and projecting thereinto, a cooking compartment removably arranged within the casing with its walls engaging the projection to form a space between the walls of the casing and compartment, the walls of the compartment being provided with openings forming communication between the interior of the compartment and the said space, a closure for the casing, and a source of supply of initial heat.

7. In a heat retaining cooking apparatus, the combination of a heat insulated casing having an entrance opening, there being a projection on the walls of the casing extending around the casing and projecting thereinto, a cooking compartment removably arranged within the casing with its walls engaging the projection to form a space between the walls of the casing and compartment, the walls of the compartment being provided with openings forming communication between the interior of the compartment and the said space, means for supplying heat to the compartment and a closure for the casing.

8. In a heat retaining cooking apparatus, the combination of an inclosing casing having an opening in one wall, a second casing removably secured within the first recited casing and having an opening in one wall registering with the first said opening, means for holding the second casing and spacing it from the inclosing casing, insulating material disposed between the walls of the casings, a closure for the second recited casing, a cooking compartment removably mounted in the latter and means for supplying heat to the compartment.

9. In a heat retaining cooking apparatus, the combination of an inclosing casing having an opening in one wall, a second casing removably secured within the first said casing and having an opening in one wall registering with the first said opening, insulating material disposed between the walls of the casings, a closure for said openings, a cooking compartment removably supported within the second recited casing, means for holding the cooking compartment spaced from the walls of the adjacent casing and means disposed within the space between the casing and compartment for supplying heat to the compartment.

10. In a heat retaining cooking apparatus, the combination of an inclosing casing having an opening in one wall, a second casing removably secured within the first said casing and having an opening in one wall registering with the first said opening, insulating material disposed between the walls of the casings, a closure for said openings, a cooking compartment removably supported within the second recited casing, means for holding the cooking compartment spaced from the walls of the adjacent casing and one or more electric heating coils removably disposed within the space between the casing and compartment, said compartment having openings in one or more of its walls forming communication between the interior of the compartment and the said space.

11. In a heat retaining cooking apparatus, the combination of a heat insulated casing having an entrance opening, a cooking compartment removably arranged within the casing and having an entrance opening registering with the opening in the casing, means for holding the walls of the compartment spaced from the walls of the casing, a closure for said openings, means disposed within the compartment for supplying heat thereto, and means disposed within the space between the walls of the compartment and casing for also supplying heat to the compartment, there being openings through one or more walls of the compartment.

12. In a heat retaining cooking apparatus, the combination of a heat insulated casing having an entrance opening, a cooking compartment removably arranged within the casing and having an entrance opening registering with the opening in the casing, means for holding the walls of the compartment spaced from the walls of the casing, a closure for said openings, means disposed within the compartment for supplying heat thereto, and means removably disposed within the space between the walls of the compartment and casing for also supplying heat to the compartment, there being openings through one or more walls of the compartment.

13. In a heat retaining cooking apparatus, the combination of a heat insulated casing having an entrance opening, a cooking compartment removably arranged within the casing and having an entrance opening registering with the opening in the casing, means for holding the walls of the compartment spaced from the walls of the casing, a closure for said openings, means disposed within the compartment for supplying heat thereto, means disposed within the space between the walls of the compartment and casing for also supplying heat to the compartment, there being openings through one or more walls of the compartment and means for controlling the last recited heating means at will.

14. In a heat retaining cooking apparatus, the combination of a heat insulated casing having an entrance opening, a cooking compartment removably arranged within the casing and having an entrance opening registering with the opening in the casing, means for holding the walls of the compartment spaced from the walls of the casing, a closure for said openings, means disposed within the compartment for supplying heat thereto, means disposed within the space between the walls of the compartment and casing for also supplying heat to the compartment, there being openings through one or more walls of the compartment, and means exterior of the casing for controlling the last recited heating means at will.

15. In a cooking apparatus of the class described, the combination of a casing and a compartment inclosed therein to form a space therebetween, there being an entrance opening to the compartment, a closure for the compartment, means for supplying heat to the compartment, and means for condensing the vapor from the compartment.

16. In a cooking apparatus of the class described, the combination of a casing and a compartment inclosed therein to form a space therebetween, there being an entrance opening to the compartment, a closure for the compartment, means for supplying heat to the compartment, and means exterior of the casing for receiving and condensing the vapor from the compartment.

17. In a cooking apparatus of the class described, the combination of a casing and a compartment inclosed therein to form a space therebetween, there being an entrance opening to the compartment, a closure for the compartment, means for supplying heat to the compartment, and means having communication with the said space for receiving and condensing the vapor from the compartment.

18. In a cooking apparatus of the class described, the combination of a casing and a compartment inclosed therein to form a space therebetween, there being an entrance opening to the compartment, a closure for the compartment, means for supplying heat to the compartment, a condenser outside of the casing for condensing the vapor from the compartment, and means forming communication between the said space and the condenser for conducting the vapor to the condenser.

19. In a cooking apparatus of the class described, the combination of a casing and a compartment inclosed therein to form a space therebetween, there being an entrance opening to the compartment, a closure for the compartment, means for supplying heat to the compartment, a condenser outside of the casing for condensing the vapor from the compartment, and means leading through the wall of the casing and forming communication between the said space and the condenser for conducting the vapor to the condenser.

20. In a cooking apparatus of the class described, the combination of a casing, a compartment arranged therein to form a space between the walls of the casing and compartment, there being an entrance opening to the compartment through the casing, a closure for the opening, said compartment having openings through one or more of its walls, means within the compartment for supplying heat thereto, and a condenser having communication with the said space.

21. In a cooking apparatus of the class described, the combination of a casing, a compartment removably arranged therein to form a space between the walls of the casing and compartment, there being an entrance opening to the compartment through the casing, a closure for the opening, said compartment having openings through one or more of its walls, means within the compartment for supplying heat thereto, and a condenser having communication with the said space.

22. In a cooking apparatus of the class described, the combination of a heat insulated casing, a compartment arranged therein to form a space between the walls of the compartment and casing, there being an entrance opening to the compartment through the casing, a closure for such opening, said compartment having openings in one or more of its walls and leading to the said space, means disposed within the space for supplying heat to the compartment, and a condenser having communication with said space.

23. In a cooking apparatus of the class described, the combination of a heat insulated casing, a compartment arranged therein to form a space between the walls of the compartment and casing, there being an entrance opening to the compartment through the casing, a closure for such opening, said compartment having openings in one or more of its walls and leading to the said space, electric heating means disposed within the space for supplying heat to the compartment, and a condenser having communication with said space.

24. In a cooking apparatus of the class described, the combination of a heat insulated casing, a compartment arranged therein to form a space between the walls of the compartment and casing, there being an entrance opening to the compartment through the casing, a closure for such opening, said compartment having openings in one or more of its walls and leading to the said space, electric heating means disposed within the said space for supplying heat to the compartment, means for controlling the heat, and a condenser having communication with the said space.

25. In a cooking apparatus of the class described, the combination of a heat insulated casing, a compartment arranged therein to form a space between the walls of the compartment and casing, there being an entrance opening to the compartment through the casing, a closure for such opening, said compartment having openings in one or more of its walls and leading to the said space, electric heating means removably disposed within the said space for supplying heat to the compartment, means for controlling the heat, and a condenser having communication with the said space.

26. In a cooking apparatus, a plurality of separate heat retaining cookers, combined in a unitary structure, each being part and parcel of the structure, electric heaters individual to the cookers and removably arranged within the walls of the cookers, means individual to the heaters for controlling them, and means for condensing the vapor from the cookers.

27. In a heat retaining cooker, the combination of a cooking compartment, a cooking vessel arranged therein, a heater for the vessel, means for holding the vessel spaced from the wall of the compartment, and a condenser for condensing the vapor from the vessel.

28. In a heat retaining cooking apparatus, the combination of an inclosing casing having an opening in one wall, a second casing removably secured within the first recited casing and having an opening in one wall registering with the first said opening, means for holding the second casing and spacing it from the inclosing casing, insulating material disposed between the walls of the casings, the insulating material adjacent the walls of the second recited casing having air channels therein, a closure for the second recited casing, a cooking apparatus removably mounted in the latter and means for supplying heat to the compartment.

29. In a heat retaining cooker, the combination of a cooking compartment, a plurality of cooking vessels of a size to be inserted in the compartment each being provided with a closure having a recess therein, and a heating plate adapted to be inserted in said recess, the separate vessels and heaters being placed one upon the other so that the plate of one vessel heats the top of its own vessel and the bottom of the interposed vessel.

30. In a cooking apparatus of the class described, the combination with a cooking compartment, of an electric heater for said compartment, and a condenser for receiving and condensing vapor from the compartment.

31. A fireless cooker consisting of a heat retaining casing, a cooking compartment, an electric heating device, and a condenser for receiving and condensing the vapor from the compartment.

In testimony whereof I have signed my name to this specification, in the presence of two subscribing witnesses, on this 29th day of September A. D. 1911.

FOREST V. DETWILER.

Witnesses:
J. H. JOCHUM, Jr.,
C. H. SEEM.